Patented July 17, 1934

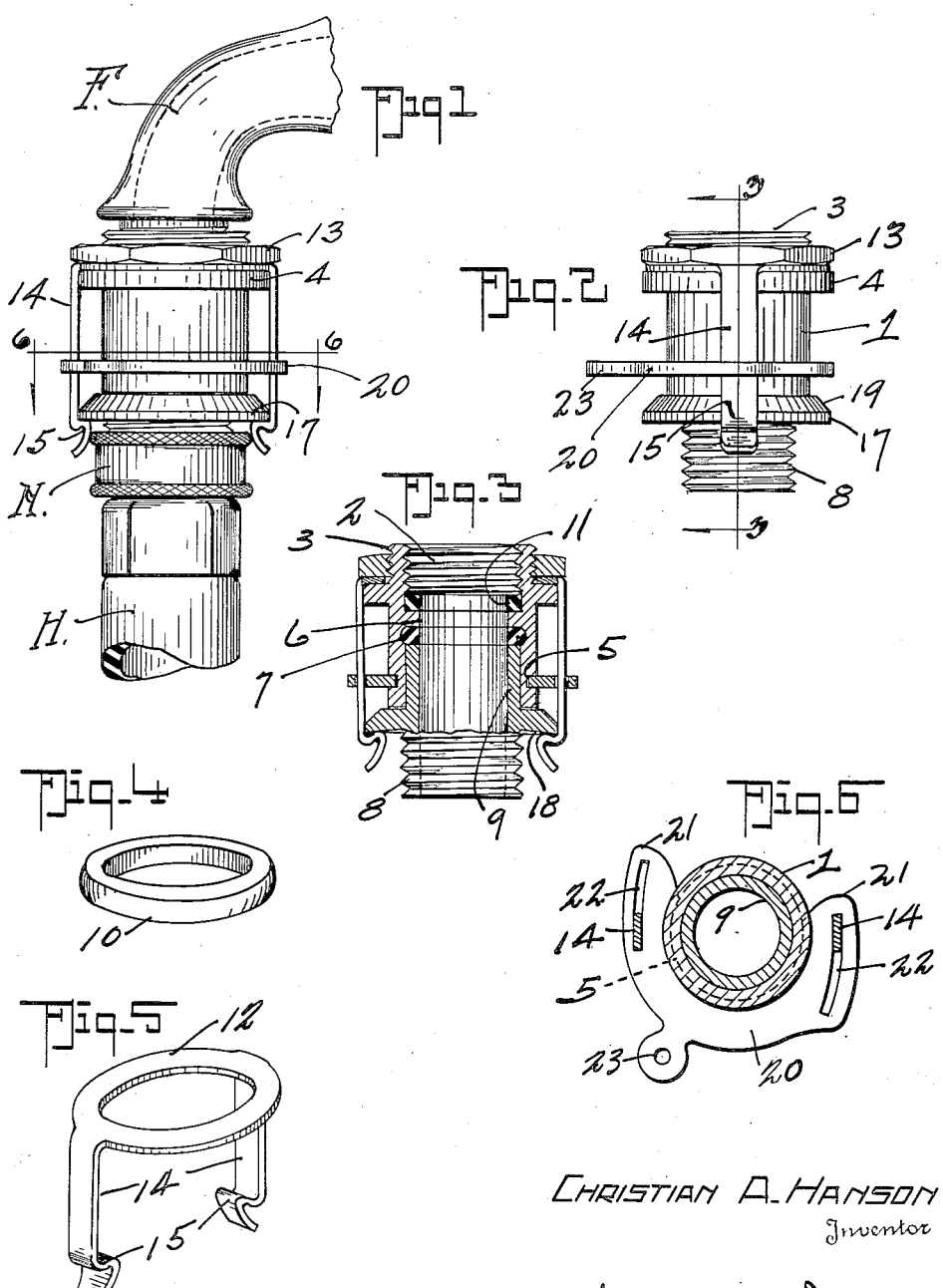

1,966,718

UNITED STATES PATENT OFFICE 1,966,718

HOSE COUPLING

Christian A. Hanson, Coeur D'Alene, Idaho, assignor, by direct and mesne assignments, to Ideal Hose Coupling Co., Inc., Coeur D'Alene, Idaho Application May 29, 1933, Serial No. 673,438

2 Claims. (Cl. 285—174)

My present invention relates to an improved hose coupling of the swivel type, designed as a quick detachable connection between two lengths of hose, and especially as a quick detachable connection between the hose and a water faucet spigot, hydrant, sill cock, or other similar water distributing fixture. The quick detachable coupling, which may be employed for domestic purposes, as on a lawn, garden, or on other similar places where grass and flowers are grown, is well adapted for use where different lengths or sections of hose are frequently employed, because of the facility with which the couplings may be connected or disconnected, and when long reaches of hose with a number of coupled sections are employed, the locking features of the individual couplings, together with the swivel features of the couplings, insure convenience in manipulating the hose for watering purposes.

In carrying out my invention I employ a socket member and a nipple member that are threaded to adjoining ends of hose, or to one end of a hose and to an adjoining fixture, and clamping means are provided for fastening together these two members with a swivel joint. In addition I provide novel locking means by which the clamp is securely locked in place in a positive manner, together with other features that insure a coupling that is comparatively simple in construction and operation, durable as to wear of its parts, and economical in cost of manufacture.

The invention consists in certain novel combinations and arrangements of these parts as will hereinafter be more fuly set forth and claimed. In the accompanying drawing I have illustrated one complete example of the physical embodiment of my invention wherein the parts are combined and arranged according to the best mode I have thus far devised for the practical application of the principles of my invention, but it will be understood that changes and alterations may be made in the exemplified structure, within the scope of my claims, without departing from the principles of my invention.

Figure 1 is a view in elevation of a coupling embodying my invention, and shown as attached to a spigot or faucet.

Figure 2 is a view of the coupling, as seen from the right in Figure 1.

Figure 3 is a vertical sectional view of the coupling, as at line 3—3 of Figure 2.

Figure 4 is a perspective view of one of the gaskets or washers employed in the coupling.

Figure 5 is a perspective view of the clamp device.

Figure 6 is a sectional view, as at line 6—6 of Figure 1, showing the cam-lock for the clamp device.

In order that the general assembly and utility of the coupling may readily be understood I have shown in Figure 1 a portion of a faucet F, with the hose H and its loose nut N attached by means of the coupling to the threaded nipple of the faucet.

In the preferred form of the invention as illustrated in the drawing I utilize a socket or thimble 1 having internal threads 2 by means of which the socket or thimble is attached to the faucet, or, in lieu of the faucet, the socket member may be threaded on the complementary fixture secured at one end of a hose.

The socket member of thimble also has a set of external threads 3, and below these threads an annular external flange 4 is fashioned. Near the opposite or plane end of the socket or thimble an annular groove 5 is fashioned in the exterior face of the thimble or socket member. Within the interior of the socket member, below the internal threads 2, another annular flange or shoulder 6 is fashioned integral with this member, and at the side of the flange, opposite to the threads 3, an annular groove 7 is fashioned in the interior face of the socket member.

The coupling member complementary to the socket or thimble is a nipple 8 having external threads for coupling with the loose nut N of the hose H, and this nipple is fashioned with an annular sleeve 9 that fits neatly in the plane end of the socket member or thimble. Between the inner end of the sleeve 9 and the annular flange 6 of the socket, a rubber ring or resilient gasket 10 is interposed and seated in the annular groove 7. The gasket is permanently seated in the groove to prevent displacement and loss, when the socket and the nipple are separated, and to insure a water tight joint between the socket and the nipple when these parts are coupled together.

Another rubber ring or gasket 11 is seated against the opposite side of the flange 6 to make a water tight joint between the socket or thimble and the faucet F, and the usual rubber ring or gasket (not shown) is employed between the nipple and the hose nut N, to insure a water tight connection throughout the different combinations of the coupling.

The plane end of the nipple is readily inserted in the open end of the socket, and when so inserted, these parts are clamped together by means of a snap-clamp device that in best illustrated in Figure 5. As therein shown the clamp comprises a flat, metal ring 12 having an interior diameter of ample size to slip over the threaded end of the socket or thimble, and this ring is adapted to fit neatly against the flat side of the flange 4 of the socket or thimble, where it is rigidly locked in place by means of a clamp screw-nut as 13 that is threaded on the exterior threaded portion 3 of the socket or thimble. The ring is fashioned with a pair of spring arms or resilient arms 14, 14, diametrically arranged and designed to lie in planes along the longitudinal axis of the coupling, and the ends of the arms terminate in fingers or inwardly bent hooks 15, 15.

For co-action with these resilient arms and hooks, the nipple is fashioned with an exterior annular flange 17 having an outer cam face or tapered face 19 and an undercut face 18.

In coupling together the socket after it has been attached to the faucet, and the nipple after it has been attached to the hose, as the nipple is slipped into the socket, the resilient arms are spread as the hooks ride over the tapered face 19 of the flange 17, then as the hooks slip over the edge of the flange, the hooks are snapped under the flange into engagement with the undercut annular face 18 of the flange, as indicated in Figure 3, and this engagement of the hooks clamps the two coupling members together, yet permitting a swivel movement of the nipple within the thimble.

For positively locking the clamp arms against accidental displacement that would permit uncoupling of the joint, I provide a cam-locking device that may be turned about the axis of the joint to rigidly lock the arms, or to release and spread the arms outwardly from the locking ring or flange 17 when the parts are to be uncoupled.

This locking device comprises an arcuate shaped plate 20 that is fashioned with a pair of jaws 21 and the plate is frictionally held in the exterior annular groove 5 of the socket member or thimble. The two jaws are provided with arcuate slots 22, 22, arranged tangentially with relation to the annular groove, and disposed in reverse directions, as indicated best in Figure 6. The arcuate plate is fashioned with a suitable handle as 23 and this handle is grasped when it is desired to oscillate the arcuate plate with relation to the grooved socket. By turning the plate 20 anti-clockwise in Figure 6, the arms 14, which pass through the slots 22 of the plate, are spread outwardly to release the hooks from the locking flange 17, and by a clock-wise turn of the plate, these arms are drawn inwardly toward the socket member where they are retained by frictional engagement of the arms within the cam slots 22.

The locking plate 20 may be turned with a sliding motion in the annular groove 5, within the limits of the length of the two cam slots 22, 22, or within the length of the slots minus the width of the two arms, but the turning movement of the plate is of course sufficient to bend the arms into clamping position and to spread the arms for release of the coupled parts. The frictional engagement between the sides of the arms and the walls of the slots is sufficient to hold the plate against accidental turning, but when the desired or required force is applied to the handle 23, the plate may be turned in either direction for locking or unlocking the clamped arms.

The swivel connection between the two parts of the coupling is not intended to be a loose one, but on the other hand the parts are neatly fitted together to pack the gasket ring 10 sufficiently tight in order to prevent leaking within the joint.

From my drawing and the above description it will be apparent that the socket and the nipple may readily be slipped together for the purpose of joining two lengths of hose, or to couple the hose to a faucet without the necessity for expert mechanical knowledge, and then by a simple turn of the locking plate the clamped parts may readily be locked in relation to one another.

Having thus fully described my invention, what I claim as new and desire to secure by Letters Patent is:—

1. In a slip-joint coupling the combination with a socket member having an annular exterior groove and an annular exterior flange, of a nipple having an annular flange, a clamp-ring mounted on the first flange and a securing nut therefor, resilient arms rigid with said ring, snap-hooks at the ends of said arms engaging the second flange, an arcuate locking plate mounted in the groove and tangentially arranged, oppositely disposed cam slots in said plate co-acting with said arms as described.

2. In a hose coupling, the combination with a socket member having an annular exterior flange near one end, of a nipple having a sleeve slipped in the socket member, an annular exterior flange on said nipple engaging the other end of the socket member, a clamp ring mounted on the first flange and a lock therefor, resilient arms on the clamp ring, snap-hooks on said arms for engaging the second flange, and releasable means mounted on the socket member for locking said arms.

CHRISTIAN A. HANSON.